Figure 1:
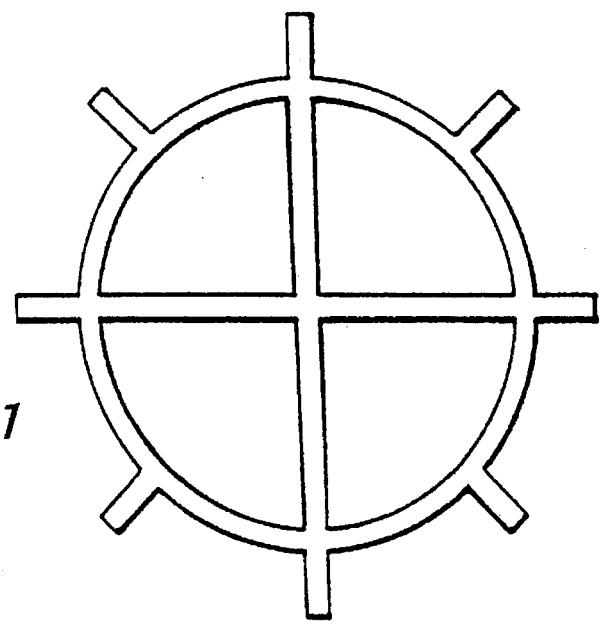
Figure 2:
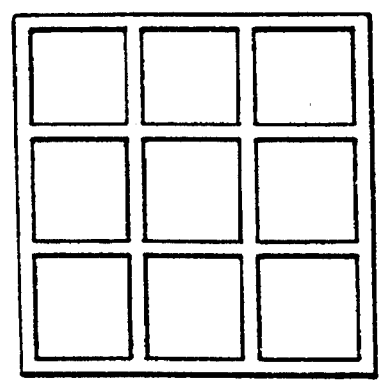
Figure 3:
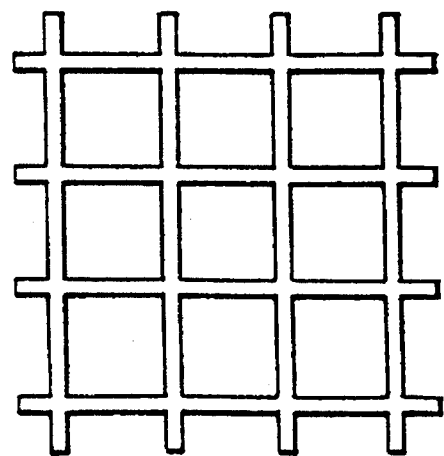

United States Patent [19]
Odegaard

[11] Patent Number: 5,458,779
[45] Date of Patent: Oct. 17, 1995

[54] METHOD FOR PURIFICATION OF WATER

[75] Inventor: Hallvard Odegaard, Saupsstad, Norway

[73] Assignee: Kaldnes Miljoteknologi A/S, Tonsberg, Norway

[21] Appl. No.: 927,628

[22] PCT Filed: Jan. 22, 1991

[86] PCT No.: PCT/NO91/00007
§ 371 Date: Aug. 28, 1992
§ 102(e) Date: Aug. 28, 1992

[87] PCT Pub. No.: WO91/11396
PCT Pub. Date: Aug. 8, 1991

[30] Foreign Application Priority Data

Jan. 23, 1990 [NO] Norway ................................ 900316
Jul. 16, 1990 [NO] Norway ................................ 903174

[51] Int. Cl.[6] ......................................................... C02F 3/06
[52] U.S. Cl. ............................................. 210/616; 210/150
[58] Field of Search ........................... 210/615–617, 210/150, 151

[56] References Cited

U.S. PATENT DOCUMENTS

| | | | |
|---|---|---|---|
| 4,067,936 | 1/1978 | Ellis et al. | 261/98 |
| 4,122,011 | 10/1978 | Strigle, Jr. | 210/150 |
| 4,391,703 | 7/1983 | Crosby | 210/151 |

FOREIGN PATENT DOCUMENTS

| | | | |
|---|---|---|---|
| 152590B | 4/1989 | Denmark. | |
| 0134131 | 3/1985 | European Pat. Off.. | |
| 0142123 | 5/1985 | European Pat. Off.. | |
| 0301237 | 2/1989 | European Pat. Off.. | |
| 2185437 | 1/1974 | France. | |
| 2296596 | 7/1976 | France. | |
| 3017439 | 11/1981 | Germany. | |
| 60-28888 | 2/1985 | Japan. | |
| 2197308 | 8/1987 | United Kingdom. | |
| 9111396 | 8/1991 | WIPO. | |

OTHER PUBLICATIONS

Abstracts of Japan, vol. 5, No. 145, C287, Abstract of JP60–28888 publ. 1985, Feb. 14.

Database WPIL Week 8721, Derwent Publications Ltd., London, GB; AN 87–146447 & JP–A–62 083 097, 16 Apr. 1987.

Primary Examiner—Thomas Wyse
Attorney, Agent, or Firm—Nixon & Vanderhye

[57] ABSTRACT

A method for water purification in which waste water is fed into a reactor containing carriers having a biofilm which promotes a desired conversion of impurities, using carriers which are particulate elements having a larger surface than smooth elements of the same dimension and having a density in the range 0.90 to 1.20, normally 0.92 till 0.98, particularly 0.92 to 0.96 kg/dm$^3$, wherein the carriers with biofilm are kept suspended in the water in a reactor for aerobic, anoxic or anaerobic water purification, comprising inlet and outlet tubes and optionally mixing means, and containing a large number of carriers for biofilm. This reactor is also comprised by the present invention.

4 Claims, 5 Drawing Sheets

METHOD FOR PURIFICATION OF WATER

The present invention relates to a method for purification of water and to a reactor for use in the method.

There are known various different methods for purification of waste water, for instance mechanically by sedimentation or sieving, chemical purification by addition of chemicals and gas treatment, for instance with ozone or chlorine. Further, it is known to treat the water biologically, i.e. by exposing the water to a culture of bacteria that will cause the desired conversion of the pollutants. To a great extent all the above mentioned method are combined.

The present invention is connected with problems in biological purification with bacterial cultures.

Biofilm, as discussed below, should be understood to be a layer of a bacterial culture, in which the bacteria may be of aerobic, anoxic or anaerobic type, depending on what kind of purification is desired.

Biological purification methods are primarily used for waste water, but may also be used for purification of water in aquacultures and for drinking water. The present invention may be exploited in all the fields where biological methods may be used for water and sewage purification, particularly in aerobic, biological processes where the reactor content is oxygenated and stirred by means of aeration, but also in anaerobic processes where the reactor content is not aerated, but is kept under stirring mechanically or hydrodynamically.

Biological methods are extensively used for purification of polluted water. Traditionally, biological methods have been used to reduce the content of organic material in the water, but particularly in the later years biotechnological methods have also been taken into use for removal of ammonium (nitrification), removal of nitrogen by denitrification and removal of phosphorus.

A distinction is made between aerobic and anaerobic processes. In aerobic processes the microorganisms need oxygen, while the microorganisms which live in anaerobic processes must have an oxygen free environment. Most of the purification plants around the world are based on aerobic processes, but there is a growing interest for anaerobic processes, particularly in connection with removal of nitrogen and purification in connection with nitrogen removal and purification of concentrated organic industry sewage.

A distinction is also made between bioslurry systems and biofilm systems. In bioslurry systems the microorganisms are floating in the water aggregated together in sludge particles in a bioreactor. In aerobic slurry systems, active slurry systems, the slurry particles are separated from the water and then returned to the bioreactor, thereby to maintain the amount of biomass as high as possible.

In biofilm systems the microorganism grow on fixed surfaces in the bioreactor. The biofilm grows in thickness as the microorganisms propagate, and parts of the biofilm will eventually peel off and new biofilm will be formed. Because the biofilm is fixed and the water moves by, the biomass does not have to be returned for the microorganisms to be exploited as much as possible.

Lately, there has been a considerable tendency to replace slurry systems by biofilm systems. The main reasons for this are:

a. The biomass per volume unit can be made considerably higher, with the result that the bioreactor will be smaller in volume.
b. The biofilm reactors can withstand greater variation in the load, and also in the composition of the raw water, which make the biofilm methods more robust than the active slurry methods.
c. The results of a breakdown in the biological process does not have such dramatic consequences in the biofilm methods as in the active sludge methods, because the sludge concentration out of the bioreactor is much lower.

The biofilm reactors existing today are based on different systems, such as biorotors (rotating biological contactors), trickling filters and fluidized bed reactors. Examples of trickling filters are given in British patent 2197308, EP-A2 301.237 and French patent 73.17859, in which the reactor is packed with elements that are immobile. There are also biofilters in which the carrier medium for the biofilm is immersed and where the water volume is aerated, but these systems are based on a solid carrier which is stationary in the reactor, or on foam rubber like elements which are allowed to float in an active sludge reactor.

The active sludge systems (slurry systems) have the disadvantage that it may be difficult to obtain sufficient control with the sludge separation, with the result that unintended loss of sludge may occur with serious consequences for the recipient.

Another obvious disadvantage with these systems is that the reactor volume will be very large, since the biomass per volume unit in the reactor becomes small.

However, compared with the traditional biofilm systems (biorotors and trickling filters) the active sludge systems have the advantage that one has to do with an open bioreactor which cannot in any way get clogged.

The greatest disadvantage with the biorotor systems is that they are based on a pre-fabricated biorotor which makes the system very little flexible. There have been considerable mechanical problems with many of the biorotors, and if the biorotor breaks down, it is difficult to adapt the biorotor to another system. True enough, there are several examples of biorotor reactors having been rebuilt to biofilter reactors, but then with a system based on a fixed filter material.

The main disadvantage with the traditional biofilter system (trickling filter) where the water is trickled over the carrier material for the biofilm and where the oxygenation takes place through natural ventilation, is that the bioreactor volume becomes relatively large. It is also a considerable disadvantage that in this system the amount of oxygen fed to the process cannot be adjusted to the amount which is used in the bioprocess and which corresponds to the organic load. It is commonly known that these circumstances result in that traditional biofilters (trickling filters) give a poorer purification effect for a given organic load per area that the other biofilm methods.

Another type of biofilter is the socalled immersed biofilter. The principle thereof is that a stationary biofilter material is immersed in the reactor while the biomass is oxygenated by aeration. The growth surface of the immersed biofilter is stationary and most often consists of corrugated plastic flakes glued together to form cubes which are placed one upon the other as building bricks or of randomly located single elements or granulates, which are all however, stationary during the use of the biofilter. The main disadvantage with the fixed, immersed biofilter, is that access to the underside of the biofilter is made very difficult. If the biofilter gets clogged from the underside, or if the aerating means, which are placed under the biofilter, get clogged, the whole biofilter has to be taken out for cleaning. It has also been a problem that whole biofilter elements have floated up as a consequence of partial clogging and capture of great air pockets in the biofilter material.

Another system is the socalled "fluidized bed" bioreactor. This is based on the bioreactor being filled with sand, and the water being pumped from the bottom to the top of the bioreactor with sufficient speed for the sand to fluidize. The biofilm grows on the sand grains. With this system a very great biomass per volume unit of the reactor can be obtained, because the specific growing area for biofilm will be large.

The disadvantage of the system is a result of the very great organic load per volume caused by this. Consequently, aerobic systems cannot be supplied with sufficient oxygen per volume unit to replace the oxygen used by the biomass. In practice, another problem has been to separate the biofilm from the sand grains, since these are so small (typically 0.4–0.6 mm).

In addition there are other systems which are in the borderland between the above discussed traditional systems. Most of these systems aim to increase the biomass per volume unit of the bioreactor by formation of a biofilm.

Most of these alternative systems are based on something in between a biofilm system and an active sludge system, the sludge from the post separation stage being returned from the post-separation bassin, in order to establish a slurry culture in addition to the biofilm culture in the bioreactor. In this way an attempt is made to "ride both horses".

This system is unfavourable because:
a. The sludge concentration in the sludge separation bassin becomes very high, which results in greater risks for the recipient because of loss of sludge.
b. The slurry particles will present an organic strain on the biofilm, a fact which has been demonstrated in several research projects.

A very important disadvantage with a system based on biomass growing on and in small foam rubber dices which are floating in the reactor, is that these dices float so well that they will be floating on the surface of the water of the bioreactor and thus give a poor contact between the biomass and the incoming substrate. Another essential disadvantage has proved to be that the biomass grows on the surface of the dice only, and not in the pore volume as intended. This is a consequence of the fact that the biofilm on the outer surface prevents access of the water and the substrate to the inner volume.

It has now been found that the essential disadvantages of the above discussed systems may be avoided, while at the same time the most important advantages of each of these can be maintained.

In the present method for purification of water there is used a new type of carrier for biofilm which may be used in a bioreactor where the relevant bioorganisms may grow on the carrier.

FIGS. 1–3, 4A, 4B, 5A, 5B, 6A, 6B, 7A & 7B illustrate various aspects of the invention.

Thus, according to the invention there is provided a method for water purification in which waste water is fed into a reactor containing carriers with a biofilm which promotes a desired conversion of impurities, and this method is characterized in that the carriers with the biofilm are kept suspended in the water in a reactor with inlet and outlet tubes and optionally mixing means. The carriers are particulate elements having a larger surface than smooth elements of the same dimension. Normally the surface of the elements will be at least 1.5 times, and particularly at least 2 times as large as the outer surface of a smooth element of the same dimensions. The density of the elements is 0.90–1.10, particularly 0.92–0.98 and most particularly 0.92–0.96 kg/dm³.

To a great extent the size of the carrier will be a question of suitability, and a suitable range will be elements having a linear dimension of from 0.2 to 3 cm, particularly from 0.5 to 1.5 cm. However, it should be emphasized that the essential feature is that the carriers are held suspended in the reactor, and other dimensions than those mentioned above can be contemplated.

Suitably, the carrier is prepared from soft plastic, so that it does not wear on the other carriers nor on the reactor itself with equipment. Since it is here a question of plastic which should primarily be a carrier for a film of bacteria, recirculated plastic can advantageously be used for the preparation of the carrier.

There is no particular limitation with respect to the form of the carrier, provided that it has a large surface per weight unit and the above defined density, in order to be kept suspended. Suitable carriers may also consist of pieces of a tube with internal separating walls. Both on the outer and the inner walls as well as on the separating walls there will be formed a biofilm layer of the desired bacterium culture. Generally, there should be as many separating walls as possible in order to make the surface extra large, but on the other hand care must be taken that the openings between the separating walls do not become so small that the openings get clogged. When the carrier is in the form of a piece of tube with internal separating walls, the tube walls may suitably comprise inward bends so that the outer wall is subjected to less friction against other carriers or against the reactor during operation. Thereby the biofilm on the outer wall of the carrier is kept more intact. A tube used for the preparation of the carrier, may for instance suitably have internal walls forming a cross. Also, the internal walls in the tube can be made to form a honeycomb pattern, but other patterns which provide a large surface and easy passage may just be well be used. It is also possible to use particles with a rough surface, for instance coarse-grained granules, even if these will have a smaller surface than said tube pieces.

Most suitably, the carrier is a piece of an extruded tube having separating walls in the longitudinal direction of the tube with "fins" on the outer side. The reason why such a carrier is particularly advantageous, is that it will be very easy to prepared, contrary to a carrier prepared by other possible methods, for instance die-casting where each carrier has to be prepared individually. For extrusion, a tube is continually extruded and cut in suitable pieces. All the separating walls will then be in the longitudinal direction of the tube, so that irrespective of where the tube is cut, the cross-section will be the same.

In addition to the carrier containing internal separating walls, it has been found advantageous that it also contains "fins" on the outer side, thus to be in the form of a piece of an extruded tube having separating walls in the longitudinal direction of the tube, both inside and outside the circumference of the tube. By such an arrangement a particularly large surface is obtained with relatively little material, for instance plastic, compared with the surface. Like the internal surfaces of the tube, also the outer surfaces close to where the "fins" extrudes from the circumference of the tube, will be protected against wear on the biofilm during use.

A suitable type of carrier with "fins" is illustrated by the cross section on FIG. 1. Seen from the side, the carrier will look like a rectangle. This is almost the simplest conceivable shape. Another shape is illustrated on FIG. 2, where the tube has a square cross section and is supplied with several internal walls. A modification of this embodiment is illustrated on FIG. 3, where the inner walls as well as the outer walls extend beyond the circumference of the tube to give the above mentioned "fins". As illustrated on FIG. 1 such "fins" do not only have to be a continuation of inner walls or outer walls, but may also be independent "fins" between those which for instance have been illustrated on FIG. 3.

The carrier is used in reactors for water purification by feeding an adjusted amount of the carrier into the reactor, and the water to be purified is treated in the reactor by the biofilm which is established and will grow on the carriers, causing the desired conversion of the pollutants. Suitably there is used a reactor with water inlet at the bottom and outlet for the purified water at the top, but such a location is not necessary, particularly if suitable mixing and circulation devices are used. The reactor is conveniently equipped with sieve means in which the mesh width is less than the smallest diameter of the carrier. This will serve to prevent that the carriers escape from the reactor. The carriers may easily be pumped in and out of the reactor, and maintenance does not require a break in the operation.

The carriers, the use thereof, the reactor and the method according to the invention, constitute a system which, compared with the above described, previously known systems, has several advantages:

The reactor volume is completely open and the growth surface for the biofilm, consisting of solid, non-porous particles, circulates around in the bioreactor, while the specific weight of the particles is very close to $1.0 \text{ kg/dm}^3$.

The bioreactor may be totally closed, and the carrier material immersed, which makes optimal contact between the impurities in the water and the microorganisms on the carriers possible, as well as complete control with possible smelling agents from the process.

The bioreactor may be oxygenated through aeration, which makes correct adjustment between consumption and supply of oxygen possible. Thus, the organic load may be adjusted in accordance with that consumed by the biomass.

The system according to the invention has the same advantage as the active sludge systems in that the reactor is open and therefore cannot become clogged. Further, the reactor may have particularly any form.

A great advantage of the present system, compared with the other biofilm systems, is that existing active sludge systems may very easily be rebuilt in such a manner that the system according to the invention may be adapted to the existing installations based on the active sludge principle. Such a rebuilding is very complicated with the other biofilm systems.

The difference between the present system and the immersed biofilter discussed above, is primarily that the growth surface for biofilm in the present system is circulated around in the bioreactor as a consequence of the turbulence made by the aeration or by hydrodynamic forces, while the growth surface in the immersed biofilter, as stated above, is stationary, and normally consists of corrugated plastic flakes glued together as cubes which are placed one upon the other as building bricks, or single elements or granules randomly placed in the bioreactor, but which are still stationary during the operation of the biofilter.

In the present system clogging of the biofilter medium will not be possible, since the biofilter medium is not stationary, but moves with the streams in the bioreactor. If the aeration devices in the reactor become clogged, it is very easy to remove the biofilter medium by simply pumping it out. Similarly, it may be pumped into the bioreactor when the process is started up.

When the bioreactor is used for anaerobic processes, where there is no aeration, the bioreactor medium is subjected to continuous or sporadic stirring, for instance by means of a propeller stirrer or by circulation pumping. Accordingly, the chance of clogging is very small, contrary to when a stationary biofilter is used, where the risk of clogging in an anaerobic system is rather great. The reactor content may here be heated to increase the reaction rates in the anaerobic processes.

In the present system the surface per volume unit desired for the operation may be decided, and because of this the oxygen supply can be adjusted in exact conformity with the oxygen consumption that takes place. The oxygen supply can also be adjusted so that air instead of pure oxygen may be used for the oxygenation. The particles on which the biofilm grows, are comparatively large, and they do not sink, but circulate, or are kept circulating, so that the particle density may be chosen independent of the amount of water desired through the reactor.

In the system according to the invention, the sludge should normally not be returned to the bioreactor with the intention to increase the biomass. However, this does not prevent that the sludge may be returned if for instance the system is used in existing active sludge installations.

A particular object of the invention is to obtain a greater disintegration rate of the substrate per volume unit of the reactor than that which is obtained by competing systems, and thereby to obtain lower costs per disintegrated weight unity of substrate.

The object is obtained by allowing the biofilm to grow on the carriers according to the invention, placed in a reactor through which the water to be purified is flowing.

When an aerobic biological process should take place in the bioreactor, the content of the reactor is aerated. Through the aeration the carriers get thoroughly mixed in the reactor volume, and good contact between the biofilm growing on the carriers and the substrate in the waste water is thereby ensured.

When an anaerobic process should take place in the bioreactor, the content of the reactor is not aerated. Thorough mixing of the content of the reactor is then ensured e.g. by mechanical stirring (propeller stirrer) or by circulation pumping of the content of the reactor.

Normally the carriers will be retained in the reactor when the water flows out of the reactor through a sieve means with light orifice less than the cross section of the carriers. For special uses, for instance in biologic removal of phosphorus, it will be possible to let the carriers follow the water out of the reactor, later to be separated off and returned to the reactor. This is in case done to let the biofilm growing on the carriers flow through both an aerobic and an anaerobic reactor.

The reactors may in pre-fabricated form be totally closed both for aerobic and anaerobic processes. This makes it possible completely to control the smell that may be produced in the reactor. Both when the reactor is used in aerobic and in anaerobic processes, the exhaust gases from the process are captured and led away. In aerobic processes the exhaust gases consist primarily of carbon dioxide and smaller amounts of other gases which are let out in the air, optionally after separate deodorizing. In anaerobic processes, the waste gases consist primarily of methane and carbon dioxide with smaller amounts of other gases. This biogas has a high heat value and accordingly may optionally be used for energy production.

When the invention is used to upgrade existing purification plants, the reactor will normally be open, since the bassins already available can then be used (for instance aeration tanks in active sludge installations).

The amount of carriers in the reactor will vary according to the field of use and the reactor volume available. Normally, the amount will be such that the carriers in an empty tank take up 30–70% of the reactor volume. However, the amount may be adjusted to the substrate load the reactor is intended to work with. Thus, the amount may be decided by the oxygenation capacity of the reactor.

The three most important values to be decided when dimensioning the bioreactor, are the volume of the reactor, the number of carriers per volume unit and the amount of oxygen to be supplied (in the case of an aerobic reactor).

The reactor itself may be built with any relevant materials, but the pre-fabricated, closed reactors will normally be built from steel or GAP, while the open reactors will normally be built from concrete or steel.

The biofilm sludge may be separated downstream the bioreactor by any of the relevant particle separation techniques, as for instance sedimentation, flotation, filtration and membrane technique.

As described generally above, the bioreactor may be used for all purification techniques based on biological degradation of a substance which should be removed.

However, the most common fields of use can be:

Removal of organic substance in waste water through aerobic reaction.

Removal of organic substance in concentrated organic sewage through anaerobic reaction.

Removal of ammonium by oxidation to nitrite and nitrate through aerobic reaction (nitrification).

Removal of nitrogen by reduction of nitrite and nitrate to nitrogen gas through anaerobic (anoxic) reaction (denitrification).

Removal of phosphorus through aerobic/anaerobic reaction.

The invention provides the following advantages in purification of waste water:

The bioreactor according to the invention requires a smaller reactor volume to remove a given weight unity of pollutant (organic substance, ammonium, etc.) than the existing traditional arrangements, since the biomass per volume unit is higher.

In pre-fabricated form the present bioreactor normally is closed, in order to obtain better control with possible smelling gases than in the traditional solutions.

In the aerobic embodiment there is a better possibility to adjust the oxygen supply in accordance with the oxygen need than in the traditional systems.

Due to the large contact surface between the biomass and the air supplied, it is reason to believe that the oxygen is better utilized in the present reactor than in the traditional active sludge installations. This entails reduced need of air and consequently lower energy costs for running the present reactor compared with the active sludge systems.

The reactor will have approximately the same design both for aerobic and anaerobic systems. As a result, an aerobic system may easily be rebuilt to an anaerobic system and vice versa. This is a particular advantage for those systems that require both an aerobic and an anaerobic step, for instance systems for biological removal of nitrogen and phosphorus.

Compared with immersed biofilters with a stationary growth surface for biofilm, the growth surface for biofilm anticipated here, is much more easy to remove from the reactor container, which simplifies cleaning, inspection and maintenance both of the reactor container and the aeration system, and which reduces the risks for clogging of the growth surface medium.

Existing biological purification plants based on active sludge can very easily increase their capacity when existing reactors are used in the system of the invention.

Figure 4A:
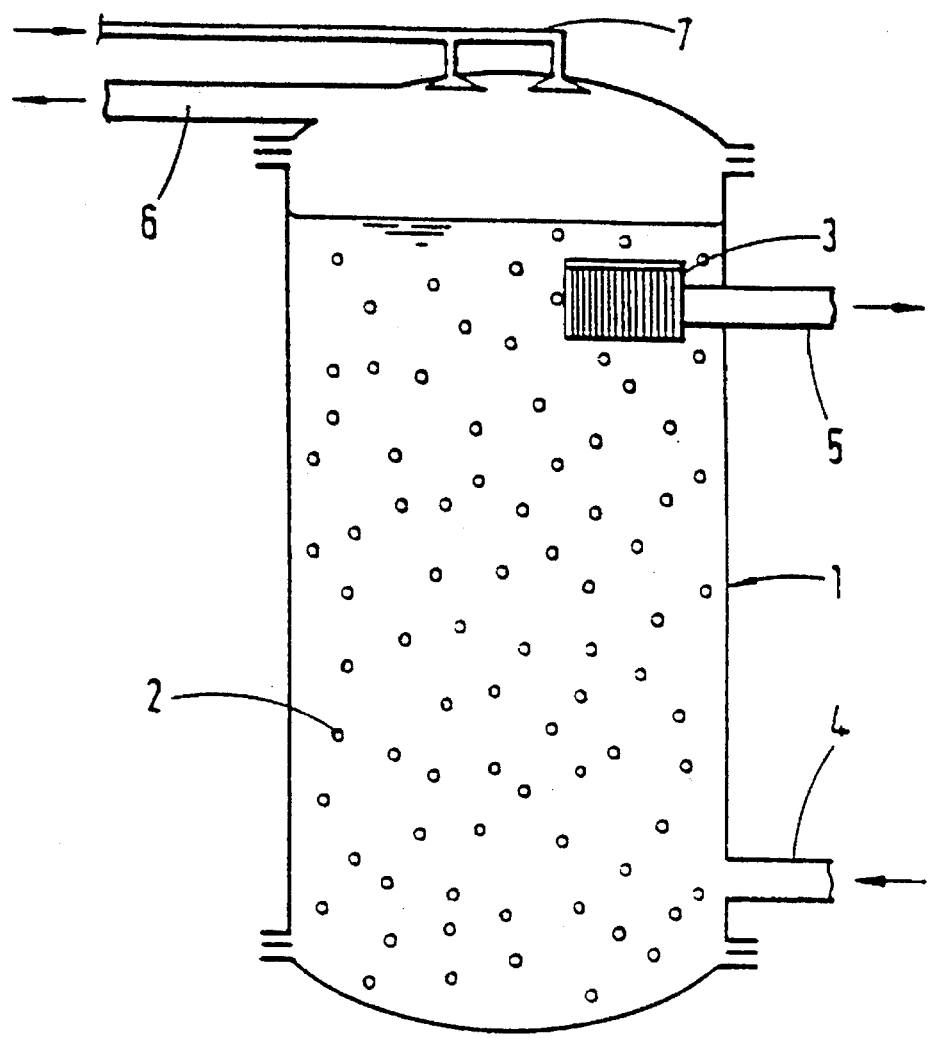
Figure 4B:
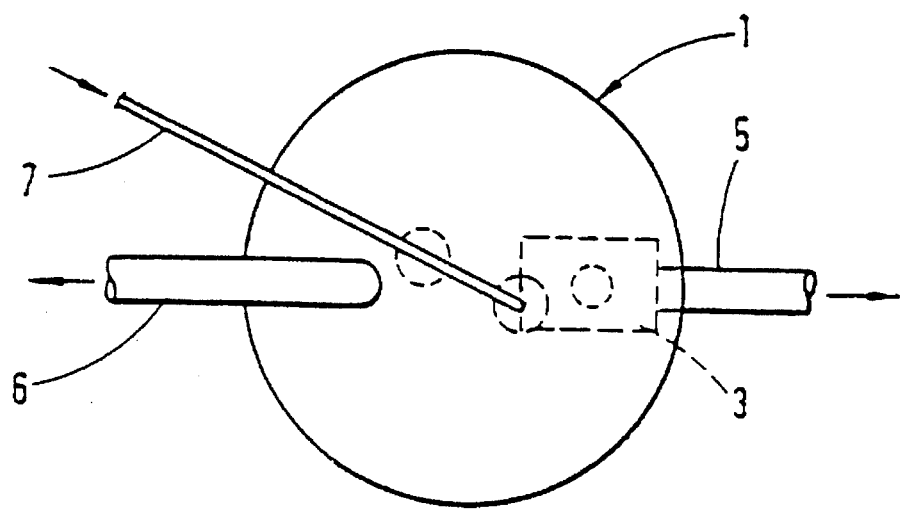

A simple reactor has been illustrated on FIGS. 4A and 4B, where the reactor 1 is a cylinder containing carriers 2 for biofilm. At the outlet for purified water 5 the reactor is equipped with a sieve means 3. Water is fed in through a tube at the bottom of the container 4, and the exhaust gas is let out through a tube in the top 6. Foam formation may be prevented by means of a sprinkler system 7 which may spray water on the surface.

Figure 5A:
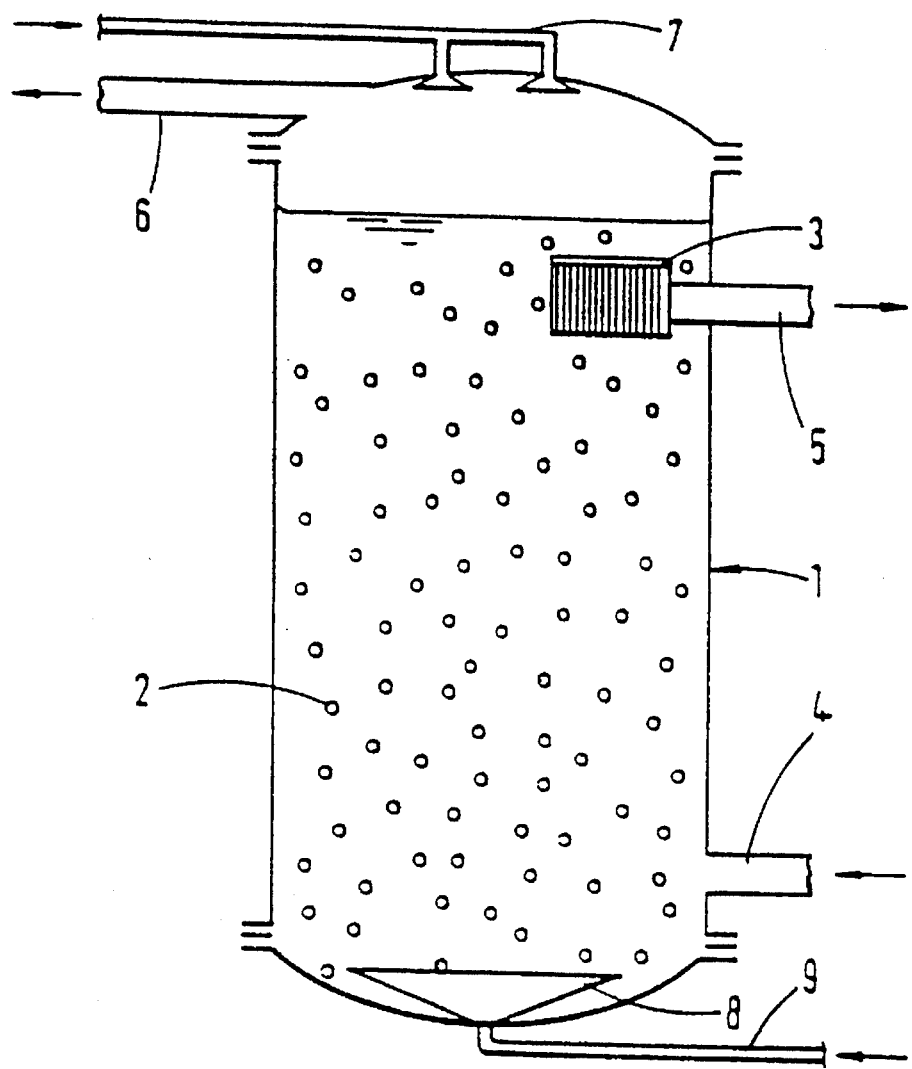
Figure 5B:
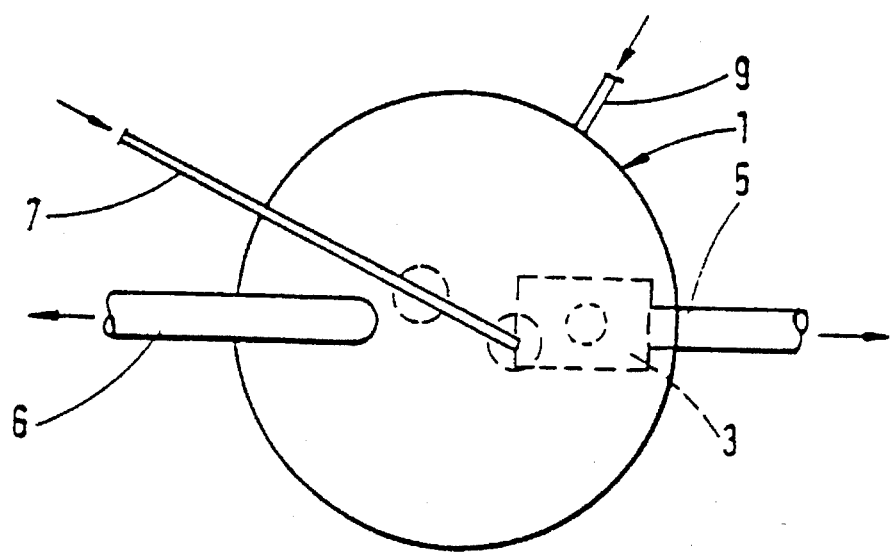
Figure 6A:
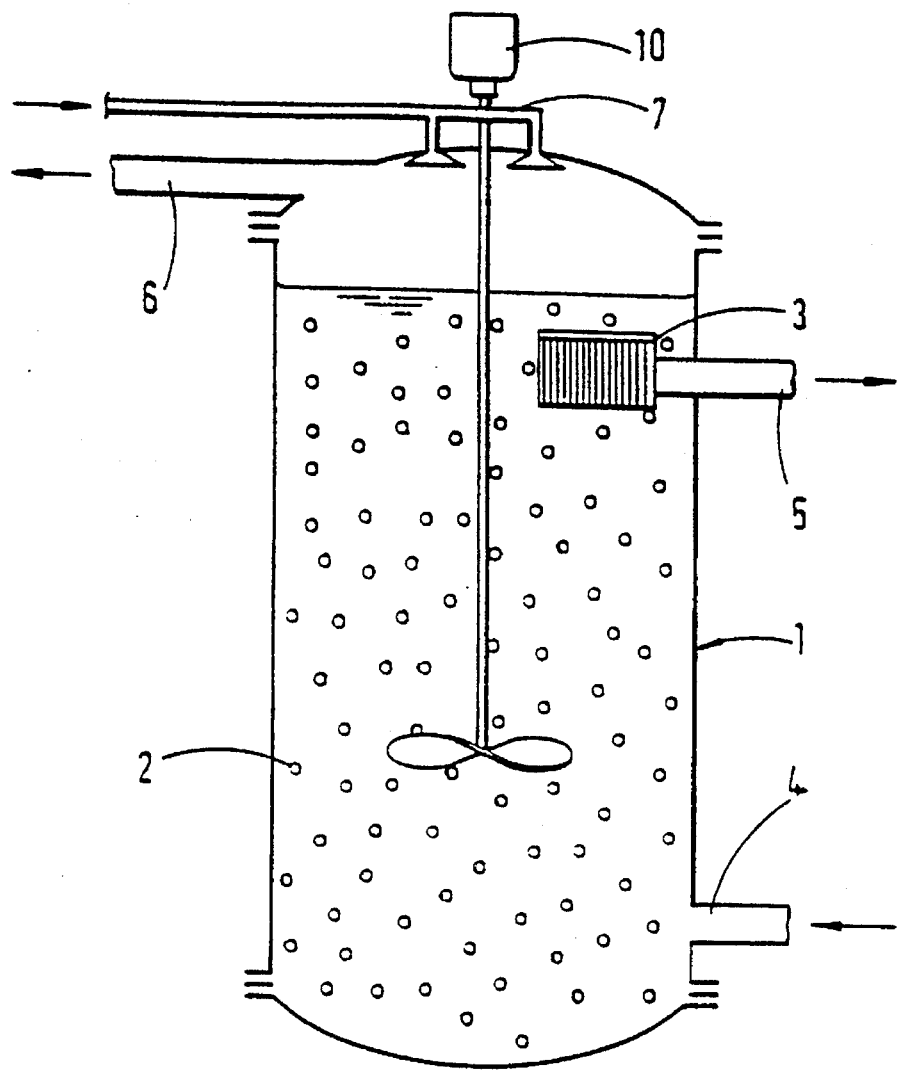
Figure 6B:
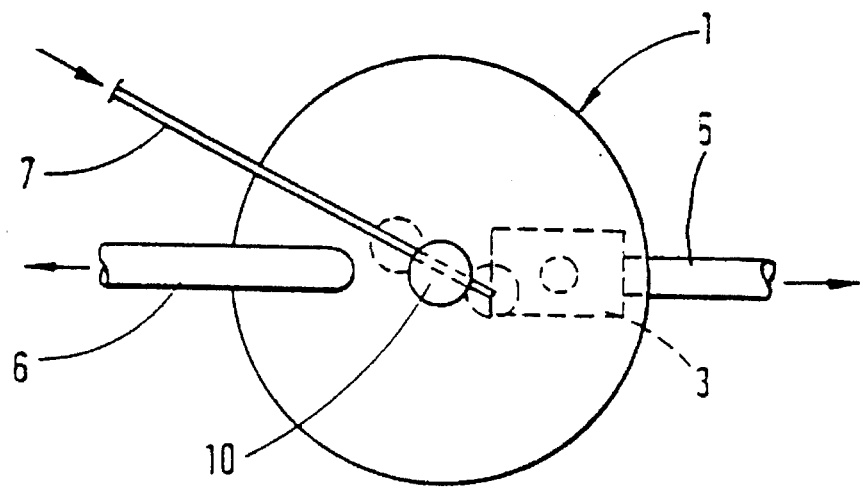
Figure 7A:
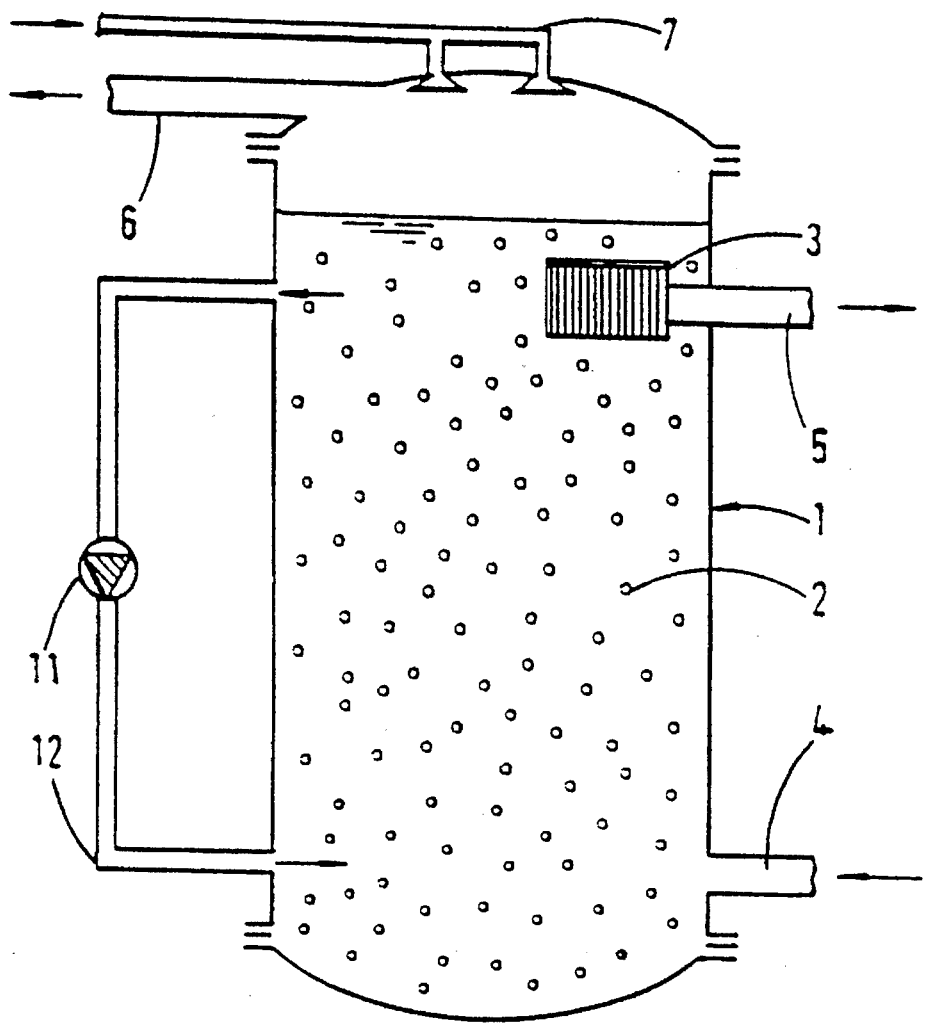
Figure 7B:
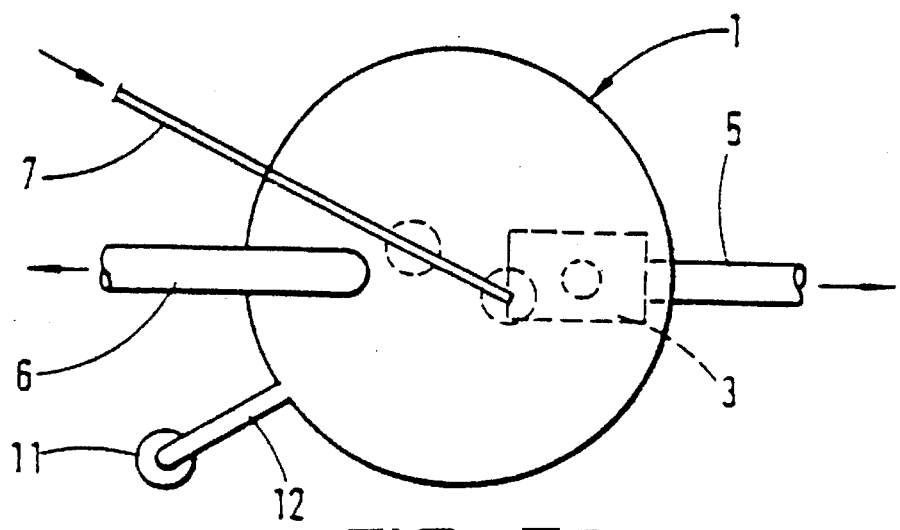

FIGS. 5A and 5B illustrates the reactor equipped with means for the admixture of air 8 which supplies air through a line 9. This reactor is intended for aerobic processes.

FIGS. 6A, 6B, 7A and 7B illustrate reactors equipped with stirring means for use in anaerobic processes, but which otherwise are similar to the reactor on FIG. 1. On FIG. 6 the stirring means is a motor-operated propeller stirrer 10, and on FIG. 7 a circulation pump 11 in an attached circulation tube 12.

I claim:

1. A biofilm method of purifying water consisting essentially of:
  i) moving waste water through a reactor having an inlet and outlet means and containing carriers, said moving being effected under conditions such that a biofilm grows on said carriers, which biofilm promotes a desired conversion of impurities, said carriers being particulate plastic elements in the form of pieces of an extruded tube and having
     a) separating walls in the longitudinal direction of said tube inside the circumference thereof, and fins on the outside of said tube in the longitudinal direction, so that water present in said reactor passes easily over said biofilm,
     b) a total surface are that is at least 2 times as large as an outer surface area of a smooth element having the same dimensions,
     c) a density in the range 0.90 to 1.20 kg/dm$^3$, and
     d) a linear dimension in the range of 0.2 to 3 cm, and
  ii) maintaining said carriers with said biofilm grown thereon in suspension and in motion in waste water present in said reactor so that said waste water is purified.

2. The method according to claim 1 wherein said carriers have linear dimensions in the range of 0.5 to 1.5 cm.

3. The method according to claim 1 wherein said carriers have a density is in the range of 0.92 to 0.96 kg/dm$^3$.

4. The method according to claim 1 wherein said carriers have a density is in the range of 0.92 to 0.98 kg/dm$^3$.

* * * * *